United States Patent
Son et al.

(10) Patent No.: US 10,145,990 B2
(45) Date of Patent: Dec. 4, 2018

(54) OPTICAL FILM AND DISPLAY DEVICE COMPRISING THE SAME

(71) Applicant: SAMSUNG DISPLAY CO., LTD., Yongin, Gyeonggi-Do (KR)

(72) Inventors: Jung Hee Son, Asan-si (KR); Nam Seok Baik, Seongnam-si (KR); Jang Seok Ma, Hwaseong-si (KR); Sang Woo An, Asan-si (KR); Gyeong Im Lee, Daegu (KR); Duk Jin Lee, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 95 days.

(21) Appl. No.: 14/714,167

(22) Filed: May 15, 2015

(65) Prior Publication Data

US 2016/0033693 A1 Feb. 4, 2016

(30) Foreign Application Priority Data

Aug. 4, 2014 (KR) .................. 10-2014-0099698

(51) Int. Cl.
*G02B 5/02* (2006.01)
*G02B 5/30* (2006.01)

(52) U.S. Cl.
CPC ......... *G02B 5/0242* (2013.01); *G02B 5/3033* (2013.01)

(58) Field of Classification Search
CPC ........... G02B 5/00; G02B 5/30; G02B 5/3008
USPC ............ 359/483.01, 493.01, 485.01, 485.03
See application file for complete search history.

(56) References Cited

U.S. PATENT DOCUMENTS

| | | | |
|---|---|---|---|
| 9,874,666 B2 | 1/2018 | Lee et al. | |
| 2001/0002153 A1* | 5/2001 | Yano | G02B 5/0242 359/599 |
| 2009/0128917 A1* | 5/2009 | Yoshinari | G02B 5/0226 359/601 |
| 2011/0317099 A1* | 12/2011 | Fuchida | G02B 5/0242 349/64 |
| 2013/0265506 A1* | 10/2013 | Nishimura | G02B 5/0242 349/12 |

FOREIGN PATENT DOCUMENTS

| | | |
|---|---|---|
| KR | 10-2006-0105296 A | 10/2006 |
| KR | 10-2011-0126921 A | 11/2011 |
| KR | 10-2013-0002267 A | 1/2013 |
| KR | 10-2015-0018694 A | 2/2015 |

* cited by examiner

*Primary Examiner* — Robert E Tallman
(74) *Attorney, Agent, or Firm* — Lewis Roca Rothgerber Christie LLP

(57) ABSTRACT

An optical film includes a polarizer and a first adhesive layer on the polarizer, where the first adhesive layer has a haze value of 90% or more.

15 Claims, 7 Drawing Sheets

103

OPTICAL FILM AND DISPLAY DEVICE COMPRISING THE SAME

CROSS-REFERENCE TO RELATED APPLICATION

This application claims priority to and the benefit of Korean Patent Application No. 10-2014-0099698, filed on Aug. 4, 2014, with the Korean Intellectual Property Office, the disclosure of which is incorporated herein in its entirety by reference.

BACKGROUND

1. Field

Aspects of the present invention relate to an optical film including a light scattering adhesive layer and a display device including the optical film.

2. Description of the Related Art

An image display device, such as a liquid crystal display (LCD), a plasma display panel (PDP), an electroluminescence display (ELD), and an organic light emitting display (OLED), exhibits low visibility when external light is reflected off a display surface. Therefore, an optical member configured to prevent external light reflection is arranged on the display substrate. Such an optical member for preventing external light reflection reduces the reflectivity of external light by light scattering or light interference, thereby improving the visibility of the display device.

Research has been conducted into improving side visibility in addition to reducing external light reflection, so as to improve the visibility of the display device. However, the optical member manufactured mainly for the purpose of preventing external light reflection is limited in improving side visibility.

It is to be understood that this background of the technology section is intended to provide useful background for understanding the technology and the disclosure provided herein, the technology background section may include ideas or concepts that were not part of what was known or appreciated by those skilled in the pertinent art prior to a corresponding effective filing date of subject matter disclosed herein.

SUMMARY

Aspects of one or more embodiments of the present invention are directed toward an optical film designed to improve side visibility of a display device and to a display device including the optical film.

According to an embodiment of the present invention, an optical film may include a polarizer and a first adhesive layer on the polarizer, where the first adhesive layer has a haze value of 90% or more.

The first adhesive layer may include an adhesive resin and light scattering particles dispersed in the adhesive resin.

A difference in refractive indices between the adhesive resin and the light scattering particles may be in a range of 0.15 to 0.25.

A refractive index of the light scattering particles may be larger than a refractive index of the adhesive resin.

The light scattering particles may have a refractive index in a range of 1.55 to 1.8.

The light scattering particles may have an average particle diameter between 1.5 μm and 2.5 μm.

The light scattering particles may include at least one of acrylic resins and polystyrene resins.

The light scattering particles may have a spherical form.

The adhesive resin may include at least one of acrylic adhesive resins, silicone-based adhesive resins, rubber-based adhesive resins, polyester-based adhesive resins and urethane-based adhesive resins.

The optical film may further include a phase difference layer on the first adhesive layer.

The optical film may further include a second adhesive layer on the phase difference layer.

The optical film may further include a phase difference layer between the polarizer and the first adhesive layer.

The optical film may further include a third adhesive layer between the polarizer and the phase difference layer.

According to an embodiment of the present invention, a display device may include a display panel and an optical film on a display area of the display panel, where the optical film includes a polarizer and a first adhesive layer on one surface of the polarizer, where the first adhesive layer has a haze value of 90% or more.

The first adhesive layer may include an adhesive resin and light scattering particles dispersed in the adhesive resin.

A difference in refractive indices between the adhesive resin and the light scattering particle may be in a range of 0.15 to 0.25.

A refractive index of the light scattering particles may be larger than a refractive index of the adhesive resin.

The light scattering particles may have a refractive index between 1.6 and 1.8.

The light scattering particles may have an average particle diameter between 1.5 μm and 2.5 μm.

The display device may further include a phase difference layer on the first adhesive layer.

The display device may further include a phase difference layer between the polarizer and the first adhesive layer.

According to embodiments of the present invention, an optical film includes an adhesive layer having a high haze value, thereby achieving excellent light diffusion. As a result, a display device including the optical film on a display surface according to an embodiment of the present invention has excellent side visibility.

The foregoing is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The above and other features and aspects of the present disclosure of invention will be more clearly understood from the following detailed description taken in conjunction with the accompanying drawings, in which.

DETAILED DESCRIPTION

Figure 1:
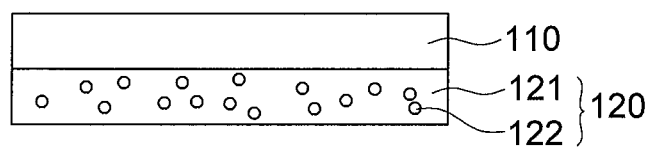
FIG. 1 is a cross-sectional view illustrating an optical film according to a first embodiment of the present invention.

Hereinafter, embodiments of the present invention will be described in more detail with reference to the accompanying drawings. The present invention may, however, be embodied in many different forms and should not be construed as being limited to the embodiments set forth herein.

In the drawings, certain elements or shapes may be simplified or exaggerated to better illustrate embodiments of the present invention, and other elements present in an actual product may also be omitted. Like reference numerals refer to like elements throughout the specification. Thus, the drawings are intended to facilitate the understanding of the present invention.

In addition, when a layer or element is referred to as being "on" another layer or element, the layer or element may be directly on the other layer or element, or one or more intervening layers or elements may be interposed therebetween. It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section, without departing from the spirit and scope of the inventive concept. When a first element is described as being "coupled" or "connected" to a second element, the first element may be directly "coupled" or "connected" to the second element, or one or more other intervening elements may be located between the first element and the second element. Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present. Expressions such as "at least one of," when preceding a list of elements, modify the entire list of elements and do not modify the individual elements of the list.

Further, the use of "may" when describing embodiments of the present invention refers to "one or more embodiments of the present invention."

Hereinafter, a first embodiment of the present invention will be described with reference to FIG. 1.

FIG. 1 is a cross-sectional view illustrating an optical film 101 according to the first embodiment of the present invention.

The optical film 101 according to the first embodiment of the present invention includes a polarizer 110 and a first adhesive layer 120 may be disposed on one surface of the polarizer 110. The first adhesive layer 120 may have a haze value of 90% or more.

A polarizing film may be used as the optical film 101 according to the first embodiment of the present invention.

The polarizer 110 may play a role in preventing external light reflection. A film where dichroic dyes are adsorbed and aligned on a poly vinyl alcohol (PVA)-based resin film may be used as the polarizer 110.

The PVA-based resins include, for example, a polyvinyl acetate that is a homopolymer of vinyl acetate or a copolymer of the vinyl acetate and another monomer that can be copolymerized with the vinyl acetate. Herein, the other monomer that can be copolymerized with the vinyl acetate may include unsaturated carboxylic acids, unsaturated sulfonic acids, olefins, vinyl ethers, and/or ammonium acrylamides.

The polarizer 110 may be manufactured by: elongating one end portion of the PVA-based resin film; dyeing the PVA-based resin film with dichroic dyes and adsorbing the dichroic dyes; processing the PVA-based resin film where the dichroic dyes are adsorbed with a boric acid solution; and washing. However, a method of manufacturing the polarizer 110 according to embodiments of the present invention is not limited thereto.

Iodine may be, for example, used as the dichroic dye and other dichroic dyes used in the pertinent art may also be used. In a case where iodine is used as the dichroic dye, the PVA-based resin film may be immersed and dyed in an aqueous solution containing iodine and potassium iodide so as to manufacture the polarizer.

A commercially available product may be used as the polarizer 110.

The thickness of the polarizer 110 may vary depending on the products to which it is applied and may be in a range of 5~40 μm.

The first adhesive layer 120 may be disposed on one surface of the polarizer 110.

The first adhesive layer 120 may include an adhesive resin 121 and a light scattering particle 122 dispersed in the adhesive resin 121.

The adhesive resin 121 may include at least one of acrylic adhesive resins, silicone-based adhesive resins, rubber-based adhesive resins, polyester-based adhesive resins and urethane-based adhesive resins.

For example, an acrylic adhesive resin may be used as the adhesive resin 121. The acrylic adhesive resin may be manufactured by an adhesive composition including an acrylic polymer and a crosslinking agent.

An acrylic copolymer may be used as the acrylic polymer. Further, a (meth)acrylate monomer that contains an alkyl group having 1 to 14 carbon atoms and a monomer containing a functional group may be used as the acrylic copolymer. Herein, "(meth)acrylate" refers to acrylate or methacrylate.

Examples of the (meth)acrylate monomer having 1 to 14 carbon atoms that may be used include methyl (meth)

acrylates, ethyl (meth)acrylates, n-butyl (meth)acrylates, s-butyl (meth)acrylates, t-butyl (meth)acrylates, isobutyl (meth)acrylates, hexyl (meth)acrylates, 2-ethylhexyl (meth) acrylates, n-octyl (meth)acrylates, isooctyl (meth)acrylates, n-nonyl (meth)acrylates, isononyl (meth)acrylates, n-decyl (meth)acrylates, isodecyl (meth)acrylates, n-dodecyl (meth) acrylates, n-tridecyl (meth)acrylates, n-tetradecyl (meth) acrylates, pentafluoro octyl acrylates, and/or 6-(1-naphthyloxy)-1-hexyl acrylates. Such examples of the (meth) acrylate monomer may be used alone or in a combination of two or more kinds thereof.

The monomer including the functional group may chemically react with the crosslinking agent so that the chemical bonding imparts cohesive force or adhesive strength to the adhesive layer. Accordingly, the cohesion of the adhesive layer may not be destroyed under conditions of high temperature or humidity.

Examples of the monomer including the functional group may include a monomer containing a sulfonic acid group, a monomer containing a phosphoric acid group, a monomer containing a cyano group, a vinyl ester, an aromatic vinyl compound, a monomer containing a carboxyl group, a monomer containing an acid anhydride group, a monomer containing a hydroxyl group, a monomer containing a amide group, a monomer containing an amino group, a monomer containing an imide group, a monomer containing an epoxy group and/or a monomer containing an ether group. Such examples of the monomer including the functional group may be used alone or in a combination of two or more kinds thereof.

Examples of the monomer containing the sulfonic acid group may include styrene sulfonic acids, allyl sulfonic acids, 2-(meth)acrylamido-2-methyl propane sulfonic acids, (meth)acrylamido propane sulfonic acids, sulfopropyl (meth)acrylates, (meth)acryloyloxy naphthalene-sulfonic acids and/or sodium vinyl sulfonates.

Examples of the monomer containing the phosphate group include 2-hydroxyethyl acryloyl phosphates and the like.

Examples of the monomer containing the cyano group may include (meth)acrylonitrile and the like.

Examples of the vinyl ester may include vinyl acetate, vinyl propionic acid, and/or vinyl lauric acid.

Examples of the aromatic vinyl compound may include styrene, chlorostyrene, chloromethyl styrene, α-methylstyrene, and other substituted styrenes.

Examples of the monomer containing the carboxyl group may include (meth)acrylic acid, carboxyethyl (meth)acrylate, carboxy pentyl (meth)acrylate, itaconic acid, maleic acid, fumaric acid, crotonic acid, and/or isocrotonic acid.

Examples of the monomer containing the acid anhydride may include maleic anhydride, itaconic acid anhydride, and acid anhydride thereof.

Examples of the monomer containing the hydroxyl group may include 2-hydroxyethyl (meth)acrylates, 2-hydroxypropyl (meth)acrylates, 4-hydroxybutyl (meth)acrylates, 6-hydroxy-hexyl (meth)acrylates, 8-hydroxy-octyl (meth)acrylates, 10-hydroxy-decyl (meth)acrylates, 12-hydroxy-lauryl (meth)acrylates, (4-hydroxymethyl-cyclohexyl)methyl acrylates, N-methylol-(meth)acrylamides, vinyl alcohol, allyl alcohol, 2-hydroxyethyl vinyl ethers, 4-hydroxybutyl vinyl ethers and/or diethylene glycol monovinyl ethers.

Examples of the monomer containing the amide group may include (meth)acrylamides, diethyl acrylamides, N-vinylpyrrolidones, N,N-dimethyl (meth)acrylamides, N, N-diethyl (meth)acrylamides, N,N'-methylene bisacrylamides, N,N-dimethylaminopropyl (meth)acrylamides and/or diacetone acrylamides.

Examples of the monomer containing the amino group may include amino ethyl (meth)acrylates, N,N-dimethylaminoethyl (meth)acrylates, N,N-dimethylaminopropyl (meth) acrylates, and/or acryloyl morpholines.

Examples of the monomer containing the imide group may include cyclohexyl maleimides, isopropyl maleimides, N-cyclohexyl maleimides and/or itaconimides.

Examples of the monomer containing the epoxy group may include glycidyl (meth)acrylates, methyl glycidyl (meth)acrylates and/or allyl glycidyl ethers.

Examples of the monomer containing the ether group may include 2-methoxyethyl (meth)acrylates, 2-ethoxyethyl (meth)acrylates, butoxyethyl (meth)acrylates, phenoxy ethyl (meth)acrylates and/or acryloyl morpholines.

Conventional methods such as solution polymerization, photopolymerization, bulk polymerization, suspension polymerization, and/or emulsion polymerization may be employed so as to polymerize the (meth)acrylate monomer containing an alkyl group having 1 to 14 carbon atoms and the monomer containing a functional group that can be crosslinked to the crosslinking agent. For example, the copolymer may be manufactured by solution polymerization or photopolymerization.

A solvent and a polymerization initiator may be used for the polymerization. The kinds of the solvent and the polymerization initiator are not limited, and thus any suitable solvent and polymerization initiator known to those skilled in the art in the pertinent art may be used.

A content ratio of the (meth)acrylate monomer containing an alkyl group having 1 to 14 carbon atoms to the monomer containing a functional group that can be crosslinked to the crosslinking agent may be in a range of 50:50 to 99:1 by weight.

The acrylic copolymer has a weight-average molecular weight of 50,000 to 2,000,000. The weight-average molecular weight is measured by gel permeation chromatography (GPC) based on polystyrene standards. For example, the acrylic copolymer may have a weight-average molecular weight of 100,000 to 1,800,000 and may have a weight-average molecular weight of 500,000 to 1,500,000. In a case where the weight-average molecular weight of the acrylic copolymer is in the above-described range, the adhesive layer 120 may have excellent adhesive properties.

The crosslinking agent may be suitably crosslinked to the acrylic copolymer, thereby strengthening the cohesion of the adhesive composition. Examples of the crosslinking agent include isocyanate compounds, epoxy compounds, melamine-based resins, and/or aziridine-based compounds. For example, an isocyanate compound or an epoxy compound may be used as the crosslink agents. Such examples of the crosslinking agents may be used either alone or in a combination of two or more kinds thereof.

Examples of the isocyanate compound include, for example, tolylene diisocyanate, xylene diisocyanate, hexamethylene diisocyanate, 2,4-diphenylmethane diisocyanate, 4,4-diphenylmethane diisocyanate, isophorone diisocyanate, tetramethyl xylene diisocyanate, and/or naphthalene diisocyanate.

Examples of the epoxy compound include, for example, ethylene glycol diglycidyl ethers, triglycidyl ethers, trimethylolpropane triglycidyl ethers, N,N,N',N'-tetraglycidyl diamines, glycerin diglycidyl ethers, and/or 1,3-bis(N,N-diglycidyl aminomethyl)cyclohexane.

An example of the melamine-based resin includes hexamethylol melamine.

Examples of the aziridine compound include, for example, N,N'-toluene 2,4-bis(1-aziridine carboxide), N,N'-diphenylmethane-4,4'-bis(1-aziridine carboxide), triethylene melamine, bisisoprotaloyl-1-(2-methyl aziridine), and/or tri-1-aziridinyl phosphine oxide.

The crosslinking agent may be contained in an amount of 0.01 to 15 parts by weight per 100 parts by weight of the acrylic copolymer. In a case where the content of the crosslinking agent is less than 0.01 parts by weight, the adhesive force of the adhesive member may deteriorate. In contrast, in a case where the content of the crosslinking agent is more than 15 parts by weight, compatibility may deteriorate, and thus the crosslinking agent may be shifted to a surface. Further, excessive crosslinking reactions may occur, such that the adhesive force may deteriorate.

Further, in order to perform photopolymerization, a photocurable polyfunctional (meth)acrylate-based monomer may be used as the crosslinking agent. The photocurable polyfunctional (meth)acrylate-based monomer may include: a bifunctional acrylate monomer such as 1,4-butanediol di(meth)acrylates, 1,6-hexanediol di(meth)acrylates, neopentyl glycol di(meth)acrylates, polyethylene glycol di(meth)acrylates, dicyclopentanyl di(meth)acrylates, caprolactone-modified dicyclopentenyl di(meth)acrylates, ethylene oxide-modified phosphoric acid di(meth)acrylates, di(acryloxyethyl) isocyanurates, allylated cyclohexyl di(meth)acrylates, dimethylol cyclopentane diacrylates, ethylene oxide-modified hexahydrophthalic acid diacrylates, tricyclodecane dimethanol acrylates, neopentyl glycol-modified trimethylolpropane diacrylates and/or adamantane diacrylates; trifunctional monomer, such as trimethylolpropane tri(meth)acrylates, dipentaerythritol tri(meth)acrylates, propionic acid-modified dipentaerythritol tri(meth)acrylates, pentaerythritol tri(meth)acrylates, propylene oxide-modified trimethylolpropane tri(meth)acrylates, and/or tris(acryloxyethyl) isocyanurates; a tetrafunctional monomer, such as diglycerin tetra(meth)acrylates and/or pentaerythritol tetra(meth)acrylates; a pentafunctional monomer, such as propionic acid-modified dipentaerythritol penta(meth)acrylate; and/or a hexafunctional monomer, such as caprolactone-modified dipentaerythritol hexa(meth)acrylates.

The examples of the photocurable polyfunctional (meth)acrylate-based monomer may be used either alone or in a combination of two or more kinds thereof.

The crosslinking agent may be used with the photopolymerization initiator that generates a radical and/or a cation when light is radiated. In this case, ultraviolet rays may be radiated as the light.

The photopolymerization initiator may include, for example, benzoins, benzoin methyl ethers, benzoin ethyl ethers, benzoin isopropyl ethers, benzoin-n-butyl ethers, benzoin isobutyl ethers, acetophenones, dimethylamino acetophenones, 2,2-dimethoxy-2-phenyl acetophenones, 2,2-diethoxy-2-phenyl acetophenones, 2-hydroxy-2-methyl-1-phenylpropan-1-one, 1-hydroxy cyclohexyl phenyl ketones, 2-methyl-1-[4-(methylthio)phenyl]-2-morpholino-propan-1-one, 4-(2-hydroxyethoxy)phenyl-2-(hydroxy-2-propyl) ketones, benzophenones, p-phenyl-benzophenones, 4,4'-diethylamino benzophenones, dichloro-benzophenones, 2-methyl anthraquinones, 2-ethyl anthraquinones, 2-t-butyl anthraquinones, 2-amino-anthraquinones, 2-methylthioxanthones, 2-ethylthioxanthones, 2-chlorothioxanthones, 2,4-dimethylthioxanthones, 2,4-diethylthioxanthones, benzyl dimethylketals, acetophenone dimethylketals, p-dimethyl-amino-benzoic acid esters and/or 2,4,6-trimethyl benzoyl diphenyl-phosphine oxides. The examples of the photopolymerization initiator may be used either alone or in combination of two or more kinds thereof.

The adhesive composition may contain 0.1 to 20 parts by weight, in some examples, 0.2 to 10 parts by weight, of the photopolymerization initiator per 100 parts by weight of the acrylic adhesive resin.

The light scattering particles 122 may function to scatter and/or diffuse light. Any substance that enables light diffusion may be used as the light scattering particles 122, without limitation. The first adhesive layer 120 has different haze values depending on the particle size and contents of the light scattering particles 122. Further, the first adhesive layer 120 may have different haze values depending on the thickness.

The haze value of the first adhesive layer 120 is increased as the particle size of the light scattering particles 122 decreases.

In a case where the particle size of the light scattering particles 122 is excessively small, the light scattering particles 122 may not be uniformly dispersed in the first adhesive layer.

That is, in a case where the average particle diameter of the light scattering particles 122 is less than 1.5 µm, the light scattering particles 122 may not be desirably dispersed in the adhesive resin 121.

For example, the small-sized light scattering particles may not be desirably dispersed in the first adhesive layer 120 and thus aggregate to form a multi-layered bulk that makes light to be back-scattered when passing through the first adhesive layer 120, which leads the optical film to have a low or relatively low degree of polarization and a low or relatively low penetration ratio. Further, in a case where the average particle diameter of the light scattering particles 122 is larger than 2.5 µm, the haze value of the first adhesive layer 120 may not be high, and thus the thickness of the first adhesive layer 120 should be increased.

In consideration of the above condition, it is desirable that the light scattering particles 122 has an average particle diameter of 1.5 µm to 2.5 µm. However, the average particle diameter of the light scattering particles is not limited thereto, and thus may be adjustable where necessary.

The form of the light scattering particles 122 is not particularly limited. The light scattering particles 122 may have, for example, a spherical or elliptical form. In one embodiment, the light scattering particles 122 may be in a state of powder having a bead form.

The first adhesive layer 120 may contain the light scattering particles 122 in an amount of 5 to 50 parts by weight per 100 parts by weight of the adhesive resin 121. In a case where the content of the light scattering particles 122 is less than 5 parts by weight per 100 parts by weight of the adhesive resin 121, the haze value of the first adhesive layer 120 may be lowered. In contrast, in a case where the concentration of the light scattering particles 122 is more than 50 parts by weight, light transmittance and adhesive endurance of the first adhesive layer 120 may deteriorate. The first adhesive layer 120 may contain 20 to 40 parts by weight of the light scattering particles 122 per 100 parts by weight of the adhesive resin 121.

The light scattering particles 122 may include at least one of, for example, acrylic resin and polystyrene resin. For example, the light scattering particles 122 may be polystyrene particles. Such polystyrene particles may include a styrene polymer and/or an acrylic-styrene copolymer.

The light scattering particles 122 have a larger refractive index than the adhesive resin 121. A difference in the refractive indices between the adhesive resin 121 and the light scattering particles 122 may be in a range of 0.15 to 0.25.

For example, the adhesive resin 121 may have the refractive index in a range of 1.4 to 1.55 and the light scattering particles 122 may have the refractive index in a range of 1.55 to 1.8.

In a case where a difference in the refractive indices between the light scattering particles 122 and the adhesive resin 121 is less than 0.15, a large amount of the light scattering particles 122 is required to be added to the adhesive resin 121 in order to bring about a sufficient light diffusion effect, such that the adhesive endurance of the first adhesive layer 120 may deteriorate. Further, in a case where a difference in the refractive indices between the light scattering particles 122 and the adhesive resin 121 is more than 0.25, the polarization properties of the optical film 101 may deteriorate.

The light scattering particles 122 may be dispersed in the adhesive composition for manufacturing the adhesive resin, and then the adhesive composition may be cured to form the first adhesive layer 120.

Meanwhile, in some embodiments, the light scattering particles 122 may be dispersed over a solvent and then the dispersed liquid may be added to the adhesive composition, such that the light scattering particles 122 in a powder form can be uniformly dispersed over the adhesive composition having a high viscosity index.

Kinds of the solvent for dispersing the light scattering particles 122 are not particularly limited. The same or substantially the same solvent used in the manufacturing of the adhesive composition may be used as the solvent for dispersing the light scattering particle 122. For example, an acetate-, benzene-, or ketone-based solvent may be used that has excellent dispersive and solvent-resistant properties for inorganic or organic particles. For example, at least one of ethyl acetate, toluene, xylene and methyl ethyl ketone may be used.

The adhesive composition on which the light scattering particles 122 are dispersed may be coated and then cured on one surface of the polarizer 110, and thus the first adhesive layer 120 may be formed on the polarizer 110, thereby forming the optical film 101. A method of coating the adhesive composition on which the light scattering particles 122 are dispersed in the polarizer 110 is not particularly limited. In some embodiments, a method selected from, for example, using a die coater, an air knife, a reverse roll, a spray, a blade, a casting, and/or gravure, micro gravure and/or spin coating may be used as the coating method.

Further, the first adhesive layer 120 may be manufactured in a separate process from the polarizer 110 and then laminated on the polarizer 110 to form the optical film 101. For example, the adhesive composition on which the light scattering particles 122 are dispersed may be coated and then cured on a release paper, thereby forming the first adhesive layer 120. Then the first adhesive layer 120 may be laminated on the polarizer 110, thereby forming the optical film 101.

The first adhesive layer 120 may have a thickness of 1 to 40 μm, and, in some embodiments, may have a thickness of 10 to 30 μm. The thickness of the first adhesive layer 120 may vary depending on the haze value and the size of the products onto which it is being applied.

The first adhesive layer 120 has a haze value of 90% or more.

The haze value is calculated as a ratio of diffused light to total light transmitted through a specimen. That is, the haze value of a specimen can be obtained by the following equation.

Haze (%)=[(Diffused light)/(Total transmitted light)]×100

Most light incident on the first adhesive layer 120 may be diffused when the first adhesive layer 120 has a haze value of 90% or more. That is, most of the incident light incident on the first adhesive layer 120 is refracted and scattered. Therefore, color mixing may be easily performed by a mixture of front light components and side light components inside the first adhesive layer 120 and the ratios of scattering or refraction of light incident on the front surface toward side surfaces may be increased, such that the light scattering toward the side surfaces may be efficiently carried out. As a result, the side visibility of a product (e.g., a display device) including the first adhesive layer 120 may be improved.

In a case where the haze value is excessively high, the total light penetration ratio of the first adhesive layer 120 may deteriorate. In consideration of the above description, the first adhesive layer 120 has the haze value in a range of 90% to 98%. For example, the first adhesive layer 120 may have a haze value in a range of 93% to 98%

Hereinafter, a second embodiment of the present invention will be described with reference to FIG. 2.

Figure 2:
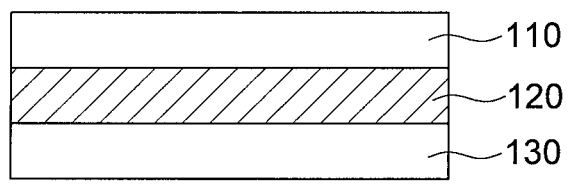
FIG. 2 is a cross-sectional view illustrating an optical film according to a second embodiment of the present invention.

FIG. 2 is a cross-sectional view illustrating an optical film 102 according to the second embodiment of the present invention. The optical film 102 according to the second embodiment of the present invention includes a polarizer 110, a first adhesive layer 120 disposed on one surface of the polarizer 110, and a phase difference layer 130 disposed on the first adhesive layer 120.

The phase difference layer 130 may shift a phase of light. The phase difference layer 130 may comprise a phase retardation plate or a phase retardation film. A quarter wave plate (QWP) may be used as the phase difference layer 130 according to the second embodiment of the present invention. However, embodiments of the present invention are not limited thereto, and thus a half wave plate (HWP) may be used as the phase difference layer 130 according to the second embodiment of the present invention.

The phase difference layer 130 may transform linearly-polarized light into circularly-polarized light. In a case where external light is incident on the optical film 102, the external light is transformed into linearly-polarized light by the polarizer 110 and then the linearly-polarized light is transformed into circularly-polarized light by the phase difference layer 130. The circularly-polarized external light may undergo destructive interference with other light reflected from the inside of a product (e.g., a display device) including the optical film 102, thereby preventing or substantially preventing the reflected light from being reflected to the outside.

Accordingly, the optical film 102 provided with the polarizer 110 and the phase difference layer 130 may be used as an external-light-reflection preventing film.

A phase difference film having a film form may be used as the phase difference layer 130.

The phase difference film may be manufactured by an elongation method. That is, if a film is elongated, a phase difference may be imparted to the film. A film elongated in the direction of the high refractive index is said to have "a positive (+) refractive index property," whereas a film elongated in the direction of the low refractive index is said to have "a negative (−) refractive index property." The phase difference film having the positive (+) refractive index property may be made of at least one of a group of triacetyl cellulose (TAC), a cycloolefin polymer (COP), a cycloolefin copolymer (COC), polyethylene terephthalate (PET), a polypropylenes (PP), a polycarbonate (PC), a polysulfone (PSF) and a polymethyl methacrylate (PMMA). Further, the phase difference film having the negative (−) refractive index property may be made of modified polystyrene (PS) and/or modified polycarbonate (PC). Such elongated film may also be manufactured by methods generally employed in the pertinent art.

For example, the phase difference film may be manufactured by a photocurable liquid crystal. In one embodiment, liquid crystal molecules are aligned on a polymer base film and then a pattern is formed thereon to manufacture the phase difference film. A cholesteric liquid crystal may be used in order to form the phase difference film, and a lyotropic liquid crystal may also be used. The resultant phase difference film may be either the QWP or the HWP according to an alignment layer and the alignment of the liquid crystal materials.

In the second embodiment of the present invention, structures or components of the phase difference layer 130 are not limited to the above description, and thus various suitable phase difference films known to those skilled in the pertinent art may be applied as the phase difference layer 130. That is, those skilled in the pertinent art may select and apply a suitable phase difference film as the phase difference layer 130.

Hereinafter, a third embodiment of the present invention will be described with reference to FIG. 3.

Figure 3:
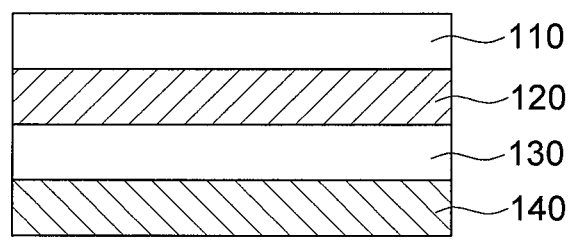
FIG. 3 is a cross-sectional view illustrating an optical film according to a third embodiment of the present invention.

FIG. 3 is a cross-sectional view illustrating an optical film 103 according to the third embodiment of the present invention. The optical film 103 according to the third embodiment of the present invention includes a polarizer 110, a first adhesive layer 120 disposed on one surface of the polarizer 110, a phase difference layer 130 disposed on the first adhesive layer 120, and a second adhesive layer 140 disposed on the phase difference layer 130.

A repeated description on the polarizer 130, the first adhesive layer 120, and the phase difference layer 130, as described in the first and second embodiments, will not be provided here.

The second adhesive layer 140 is configured to attach the optical film 130 to the display device. A haze value of the second adhesive layer 140 is not particularly limited. The second adhesive layer 140 may have the haze value of 90% or more or less than 90%. For example, the second adhesive layer 140 may have the haze value in a range of 60% to 90%. The second adhesive layer 140 may be made of the same or substantially the same material as the first adhesive layer 120, but may have a different concentration of the light scattering particles 122.

Hereinafter, a fourth embodiment of the present invention will be described with reference to FIG. 4.

Figure 4:
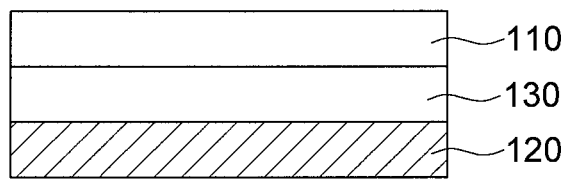
FIG. 4 is a cross-sectional view illustrating an optical film according to a fourth embodiment of the present invention.

FIG. 4 is a cross-sectional view illustrating an optical film 104 according to the fourth embodiment of the present invention. The optical film 104 according to the fourth embodiment of the present invention includes a polarizer 110, a phase difference layer 130 disposed on one surface of the polarizer 110, and a first adhesive layer 120 disposed on the phase difference layer 130.

In the optical film 104 according to the fourth embodiment of the present invention, the phase difference layer 130 may be integrally formed with the polarizer 110 or the polarizer 110 and the phase difference layer 130 may be separately formed and bonded to each other.

For example, an alignment layer may be formed on the polarizer 110 having a film form, and a liquid crystal polymer substance may be coated and cured thereon, thereby manufacturing the phase difference layer 130 including the liquid crystal material aligned along the alignment layer. The phase difference layer 130 is described for the second embodiment of the present invention, and thus a repeated description will not be provided here.

The first adhesive layer 120 is disposed on the phase difference layer 130. The first adhesive layer 120 is described for the first embodiment of the present invention, and thus a repeated description will not be provided here.

Hereinafter, a fifth embodiment of the present invention will be described with reference to FIG. 5.

Figure 5:
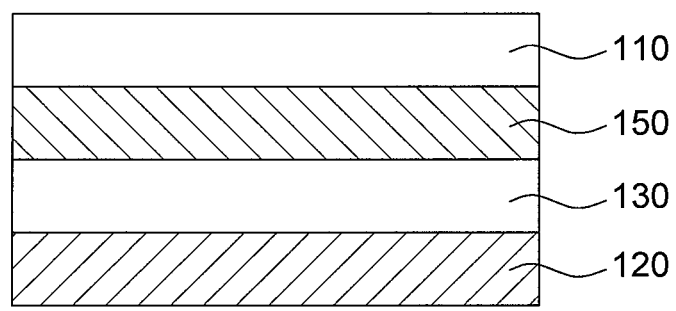
FIG. 5 is a cross-sectional view illustrating an optical film according to a fifth embodiment of the present invention.

FIG. 5 is a cross-sectional view illustrating an optical film 105 according to the fifth embodiment of the present invention. An optical film 105 according to the fifth embodiment of the present invention includes a polarizer 110, a third adhesive layer 150 disposed on one surface of the polarizer 110, a phase difference layer 130 disposed on the third adhesive layer 150, and a first adhesive layer 120 disposed on the phase difference layer 130.

The polarizer 110 and the phase difference layer 130 may be separately formed and bonded to each other in order to form the optical film 105 according to the fifth embodiment of the present invention. For example, the polarizer 110 having a film form and the phase difference film are bonded to each other with the third adhesive layer 150 interposed therebetween and then the first adhesive layer 120 is disposed on the phase difference film on the opposite side from the polarizer 110 in order to form the optical film 105. In this case, the phase difference film becomes the phase difference layer 130.

The third adhesive layer 150 may function as an adhesive member to bond the polarizer 110 having a film form to the phase difference film.

An optical adhesive member may be used as the third adhesive layer 150. The third adhesive layer 150 may have a haze value of 90% or more or less than 90%. The third adhesive layer 150 may be made of the same or substantially the same material as the first adhesive layer 120, but may have a different concentration of the light scattering particles 122.

Hereinafter, a lightpath of light incident on the first adhesive layer 120 will be described with reference to FIG. 6.

Figure 6:
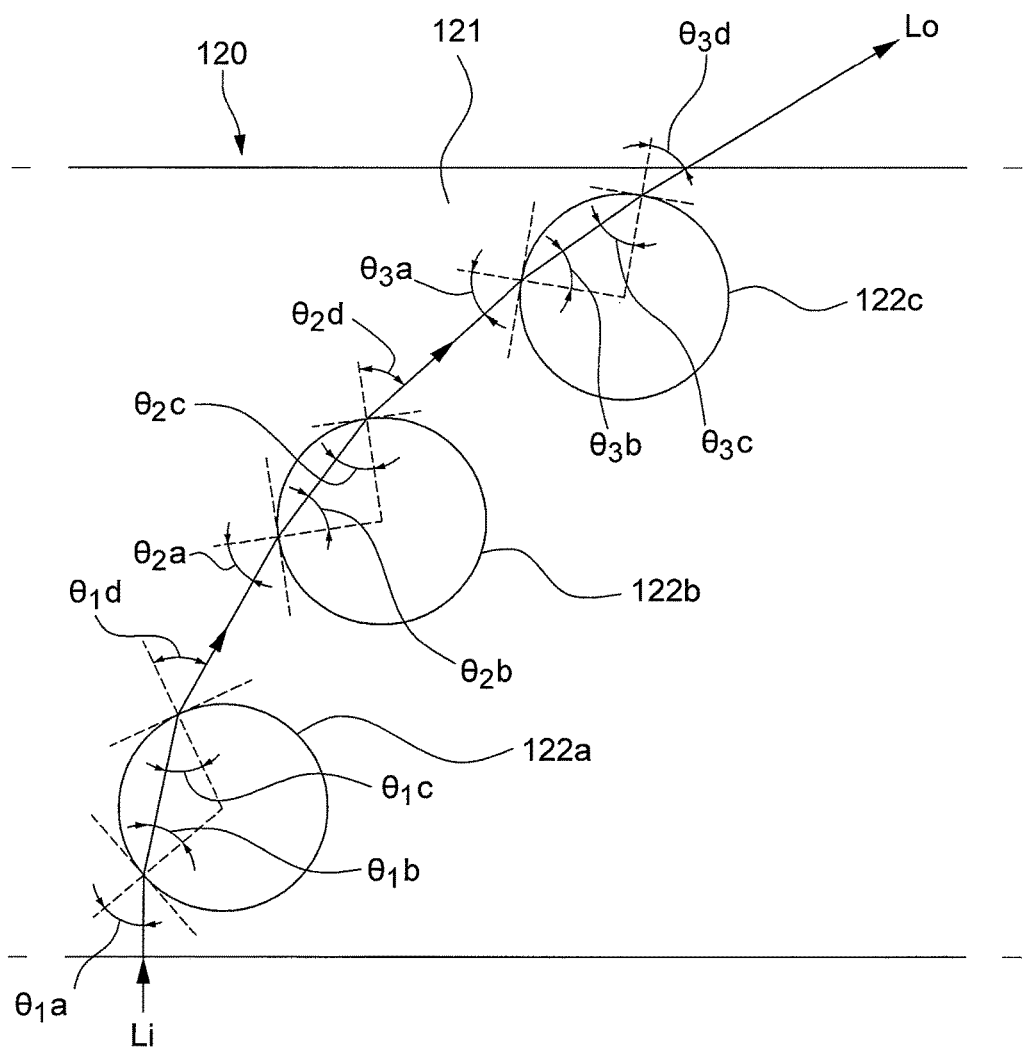
FIG. 6 is a mimetic diagram illustrating a lightpath.

FIG. 6 illustrates the lightpath of light propagating through the light scattering particles 122 disposed on the first adhesive layer 120. For example, FIG. 6 illustrates the lightpath of input light Li that is outputted as output light Lo via a first light scattering particle 122a, a second light scattering particle 122b, and a third light scattering particle 122c.

After the input light Li is incident on the first adhesive layer 120, the input light Li that is incident at a point of the first light scattering particle 122a at an angle $\theta_1 a$ may be refracted at an angle $\theta_1 b$. The input light Li is then incident at another point of the first light scattering particle 122a at an angle $\theta_1 c$ toward the adhesive resin 121 and refracted at an angle $\theta_1 d$. Subsequently, the input light Li propagates through the second light scattering particle 122b and repeats incidence and refraction at angles $\theta_2 a$, $\theta_2 b$, $\theta_2 c$, $\theta_2 d$. Then, the input light Li propagates through the third light scattering particle 122c and repeats incidence and refraction at angles $\theta_3 a$, $\theta_3 b$, $\theta_3 c$, $\theta_3 d$. Accordingly, the input light Li is consequently outputted as the output light Lo having a changed lightpath emitted from the first adhesive layer 120 at an angle (e.g., a predetermined angle).

Thus, the light incident on the first adhesive layer 120 is dispersed by the light scattering particles 122 in the first adhesive layer 120, which leads to a high rate of diffused light and a color mixing occurs by the mixing of light incident on the front surface and light incident on the side surface, thereby reducing a color difference between the light incident on the front surface and the light incident on the side surface.

As a result, WAD of the display device applying the first adhesive layer 120 is reduced. The WAD refers to a chromaticity variation observed at the side viewing angle. For example, the WAD refers to a phenomenon where a color of light emitted from a light emitting surface appears differently when viewed from the front surface and when viewed from the side surface. For example, white light is viewed when the display surface of the display device emitting white light is viewed from the front side. However, some levels of the blue or yellow component may be observed when viewed from the side surface due to the light wavelength shift.

Figure 7:
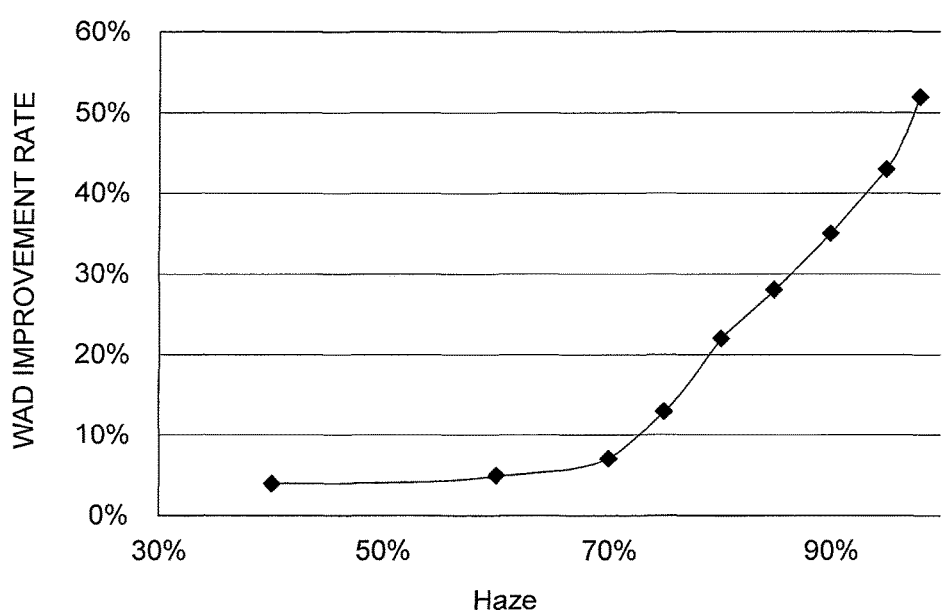
FIG. 7 is a graph illustrating a relationship between a haze value and white angular dependency (WAD) improvement.

FIG. 7 is a graph illustrating a WAD improvement in accordance with the haze value.

FIG. 7 illustrates a WAD improvement result of an adhesive layer having a thickness of 20 μm an and an incident angle of 60° depending on a change in the haze value. Herein, amounts of reduction in chromaticity coordinates variation $\Delta u'v'$ in accordance with the increasing haze value are compared with an amount of the chromaticity coordinates variation when the haze value is 0 in order to evaluate the WAD improvement rate. CIE 1931 is applied as the chromaticity coordinates. FIG. 7 shows that the WAD improvement rate is 30% or higher when the haze value is 90% or more.

Experiments 1 and 2

A stirrer, a thermometer, a reflux condenser, a dropping lot and a nitrogen gas inlet tube are equipped in a 4-neck jacket reactor (1 L), nitrogen gas is injected to the reactor, 120 parts by weight of ethyl acetate, 98 parts by weight of n-butyl acrylates, 0.5 parts by weight of acrylic acid and 1.4 parts by weight of 2-hydroxyethyl acrylates are injected to the reactor, and then the external temperature of the reactor is heated up to 50° C. Subsequently, a solution where 0.1 parts by weight of 2,2'-azobisisobutyronitriles (AIBN) is completely dissolved in 10 parts by weight of ethyl acetate is added in the reactor. After an additional 5 hours reaction is completed, maintaining the outside temperature at 50° C., the resultant solution is diluted with ethyl acetate, thereby producing an acrylic copolymer solution with a solid content of 20%. The weight-average molecular weight of the obtained copolymer solution is 1,500,000 by GPC and the refractive index is 1.42.

A solution where 100 parts by weight of the resultant acrylic copolymer resin (based on the solid content), 0.8 parts by weight of a crosslinking agent of trimethylolpropane-modified tolylene diisocyanate (made by Coronate L, Nippon Polyurethane Industry Co., Ltd.), 0.15 parts by weight of 3-glycidoxypropyl trimethoxy silane (KBM-403), and polystyrene (PS) particles (with an average diameter of 2 μm and a refractive index of 1.595, made by Sekisui CO., LTD.), which are used as the light scattering particles, are dissolved in an ethyl acetate solvent and diluted using ethyl acetate to a final concentration of 13%, thereby forming the adhesive member. In this case, the haze value is adjusted by adjusting the content of the polystyrene particles used as the light scattering particles. Experiment 1 incorporates light scattering particles to provide a haze value of 90%, and Experiment 2 incorporates light scattering particles to provide a haze value of 96%. In addition, a case in which the haze value of 0 is used as a contrasting example.

The resultant adhesive member is disposed on the PVA polarizer to form the adhesive layer, thereby producing the optical film.

Further, the optical film is disposed on the display surface of the display device and then WAD is measured. The CIE 1931 chromaticity coordinates is used as standard chromaticity coordinates and degrees of the chromaticity variation of a skin color (x=0.37, y=0.35) at the viewing angle of 60° are compared to measure a degree of the WAD improvement (Table 1).

TABLE 1

|  | Haze value of adhesive layer | Transmittance | Chromaticity coordinates | | | WAD improvement rate |
|---|---|---|---|---|---|---|
|  |  |  | $\Delta x$ $(\times 10^{-4})$ | $\Delta y$ $(\times 10^{-4})$ | $\Delta u'v'$ $(\times 10^{-4})$ |  |
| Contrasting example | 0% | — | 326 | 292 | 262 |  |
| Experiment 1 | 90% | 42% | 162 | 196 | 170 | 35.1% |
| Experiment 2 | 96% | 35% | −214 | 62 | 130 | 50.4% |

In the contrasting example where the light scattering particles is not included in the adhesive layer, the chromaticity variation $\Delta u'v'$ is 0.0262 at the viewing angle of 60°. However, in the case of Experiment 1 where the haze value of the adhesive layer is 90%, the chromaticity variation $\Delta u'v'$ is reduced to 0.01710 and the WAD is improved by 35.1%. Further, in the case of Experiment 2 where the haze value of the adhesive layer is 96%, the chromaticity variation $\Delta u'v'$ is reduced to 0.0130 and the WAD is improved by 50.4%.

Figure 8:
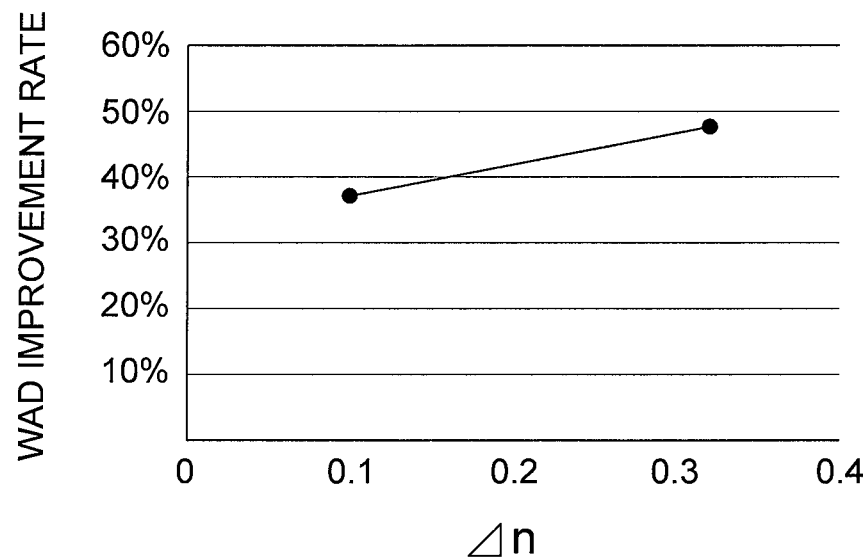
FIG. 8 is a graph illustrating a relationship between a difference in refractive indices and the WAD improvement.

FIG. 8 is a graph illustrating the relationship between a difference in refractive indices and WAD improvement.

FIG. 8 illustrates the WAD improvement rate correlated with the difference in the refractive indices between the adhesive resin 121 and the light scattering particles 122 where the haze value is 90%. FIG. 8 shows that the WAD improvement rate is increased in accordance with an increase in the refractive index difference between the adhesive resin 121 and the light scattering particles 122.

Figure 9:
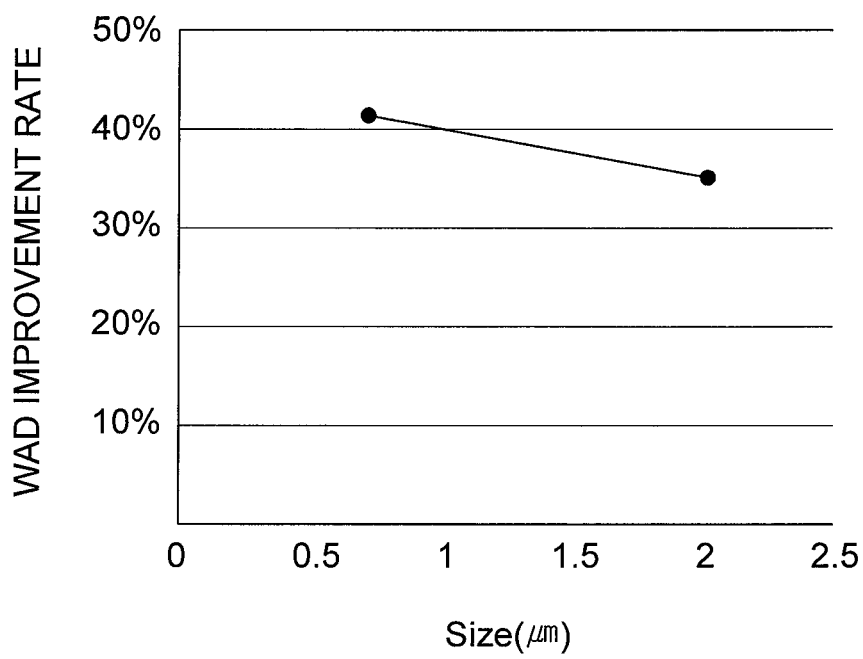
FIG. 9 is a graph illustrating a relationship between a particle size of a light scattering particle and the WAD improvement.

FIG. 9 is a graph illustrating the relationship between the particle size of the light scattering particles and the WAD improvement.

FIG. 9 illustrates the WAD improvement rate correlated with the particle size of the light scattering particles 122 where the haze value is 90%. FIG. 9 shows that the WAD improvement rate is increased in accordance with a decrease in the particle size of the light scattering particles 122.

Hereinafter, a display device according to a sixth embodiment of the present invention will be described with reference to FIGS. 10 and 11.

Figure 10:
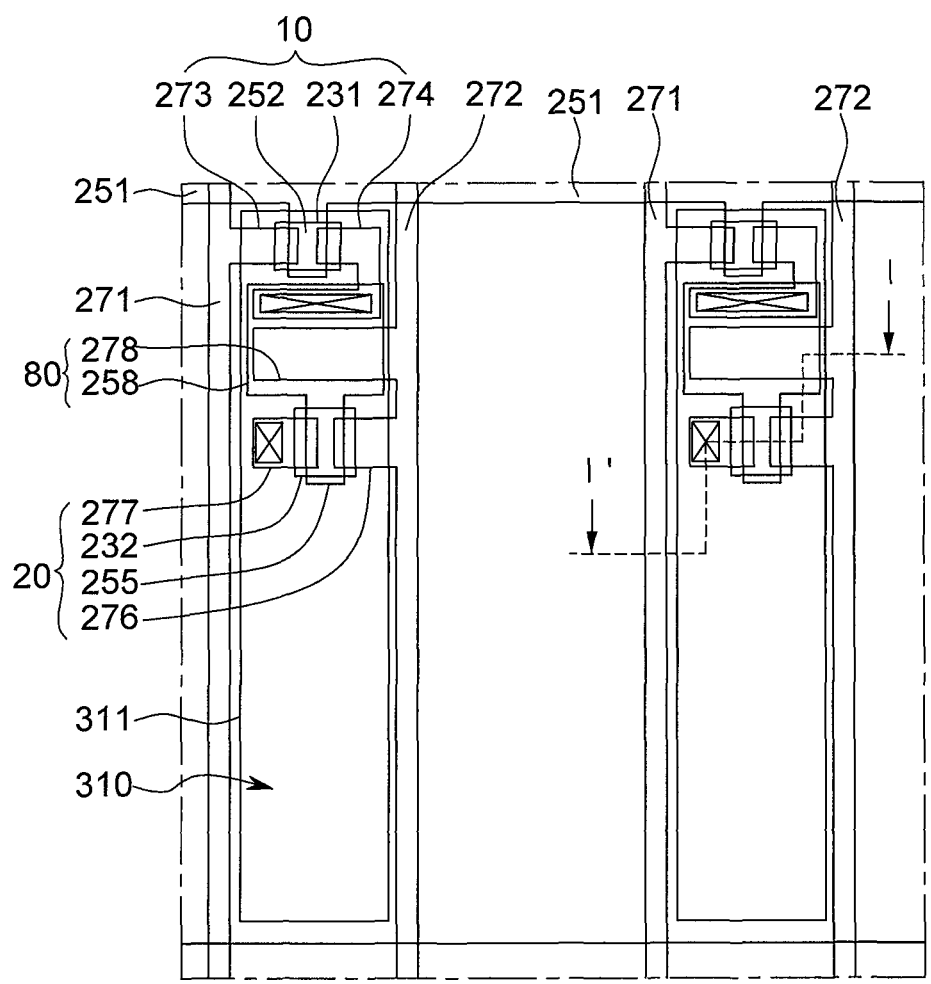
FIG. 10 is a plan view illustrating a configuration of a display device according to a sixth embodiment of the present invention.
Figure 11:
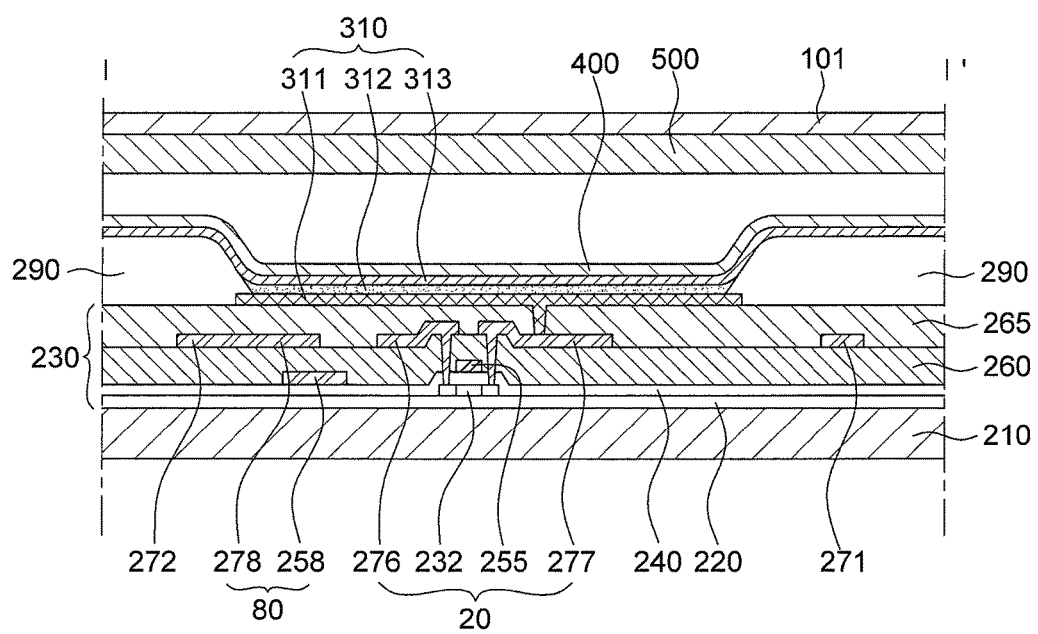
FIG. 11 is a cross-sectional view taken along the line I-I' of FIG. 10.

FIG. 10 is a plan view illustrating a configuration of the display device according to the sixth embodiment of the present invention and FIG. 11 is a cross-sectional view taken along a line I-I' of FIG. 10.

The display device according to the sixth embodiment of the present invention includes a display panel and an optical film disposed on a display area of the display panel. The optical film includes a polarizer and a first adhesive layer disposed on one surface of the polarizer and the first adhesive layer has a haze value of 90% or more.

An OLED display is used as the display device according to the sixth embodiment of the present invention. As illustrated in FIGS. 10 and 11, the OLED display device 201 according to the sixth embodiment of the present invention includes a first substrate 210, a wiring 230, an OLED 310, a protective layer 400, a second substrate 500, and an optical film 101. The OLED display device 201 may further include a buffer layer 220 and a pixel defining layer 290.

The first substrate 210 may be formed of an insulating substrate selected from a group of glass, quartz, ceramic, plastic and the like. However, the sixth embodiment of the present invention is not limited thereto. Therefore, the first substrate 210 may also be made of a metal material, such as stainless steel and the like.

The buffer layer 220 may be disposed on the first substrate 210. The buffer layer 220 may include one or more layers selected from a variety of inorganic and/or organic layers. However, the buffer layer 220 may not be necessary.

The driving circuit 230 may be disposed on the buffer layer 220. The driving circuit 230 may include a plurality of thin film transistors 10 and 20 and drives the OLED 310. That is, the OLED 310 may display an image by emitting light according to a driving signal supplied by the driving circuit 230.

Although FIGS. 10 and 11 illustrate an active-matrix OLED display having a 2Tr-1 Cap structure, which includes two thin film transistors TFTs 10 and 20 and a capacitor 80 in one pixel, the sixth embodiment of the present invention is not limited thereto. In some embodiments, the OLED display device may have many different structures including three or more TFTs and two or more capacitors in one pixel, and may further include additional lines. Herein, the term "pixel" refers to the smallest unit for displaying an image. The OLED display device displays an image using a plurality of pixels.

Each pixel includes a switching thin film transistor 10, a driving thin film transistor 20, a capacitor 80, and an OLED 310. Herein, a structure including the thin film transistor 10, the driving thin film transistor 20, and the capacitor 80 is called a driving circuit 230. The driving circuit 230 further includes a gate line 251 arranged along one direction, a data line 271 and a common power line 272 insulated from and intersecting the gate line 251. The pixel may be defined by the gate line 251, the data line 271, and the common power line 272, but is not limited thereto. The pixel may also be defined by a black matrix or a pixel defining layer.

The OLED display device 310 includes a first electrode 311, a light emitting layer 312 disposed on the first electrode 311, and a second electrode 313 disposed on the light emitting layer 312. The light emitting layer 312 is made of low molecular weight organic materials or high molecular weight organic materials. In the OLED, a hole and an electron are injected from the first electrode 311 and the second electrode 313 into the light emitting layer 312. The hole and the electron are combined with each other to form an exciton, and the OLED emits light by energy generated when the exciton falls from an excited state to a ground state.

The capacitor 80 may include a pair of capacitor plates 258 and 278 with an interlayer insulating layer 260 interposed therebetween. Herein, the interlayer insulating layer 260 may be a dielectric material. Capacitance of the capacitor 80 may be determined by electric charges stored in the capacitor 80 and voltage across the pair of capacitor plates 258 and 278.

The switching TFT 10 may include a switching semiconductor layer 231, a switching gate electrode 252, a switching source electrode 273, and a switching drain electrode 274. The driving TFT 20 may include a driving semiconductor layer 232, a driving gate electrode 255, a driving source electrode 276, and a driving drain electrode 277. In addition, the semiconductor layers 231 and 232 may be insulated from the gate electrodes 252 and 255 by a gate insulating layer 240.

The switching TFT 10 may function as a switching device which selects a pixel to perform light emission. The switching gate electrode 252 may be connected to the gate line 251. The switching source electrode 273 may be connected to the data line 271. The switching drain electrode 274 may be spaced apart from the switching source electrode 273 and may be connected to one capacitor plate 258.

The driving TFT 20 may apply a driving power to the first electrode 311 that serves as a pixel electrode, such that the light emitting layer 312 of the OLED 310 in a selected pixel can emit light. The driving gate electrode 255 may be connected to the capacitor plate 258 connected to the switching drain electrode 274. The driving source electrode 276 and the other capacitor plate 278 may be respectively connected to the common power line 272. The driving drain electrode 277 may be connected to the first electrode 311 of the OLED 310 through a contact hole formed in a planarization layer 265.

With the above-described structure, the switching TFT 10 may be operated by a gate voltage applied to the gate line 251, and may function to transmit a data voltage applied to the data line 271 to the driving TFT 20. Voltage equivalent to a difference between a common voltage applied from the common power line 272 to the driving TFT 20 and the data voltage transmitted from the switching TFT 10 may be stored in the capacitor 80, and current corresponding to the voltage stored in the capacitor 80 may flow to the OLED 310 through the driving TFT 20, so that the OLED 310 may emit light.

According to the sixth embodiment of the present invention, the first electrode 311 may be formed as a reflective layer and the second electrode 313 may be formed as a transflective layer. Therefore, light generated from the light emitting layer 312 is emitted through the second electrode 313. That is, the OLED display device according to the sixth embodiment of the present invention has a structure of a top-emission type display device.

At least one of a hole injection layer (HIL) and a hole transporting layer (HTL) may be disposed between the first electrode 311 and the light emitting layer 312. Further, at least one of an electron transporting layer (ETL) and an electron injection layer (EIL) may be disposed between the light emitting layer 312 and the second electrode 313.

The pixel defining layer 290 has an opening. The opening of the pixel defining layer 290 exposes a part of the first electrode 311. The first electrode 311, the light emitting layer 312, and the second electrode 313 are sequentially laminated on the opening of the pixel defining layer 290. Herein, the second electrode 313 is formed not only on the light emitting layer 312 but also on the pixel defining layer 290. In addition, the HIL, HTL, ETL, and/or EIL may be disposed between the first electrode 311 and the second electrode 313. The OLED 310 may generate light by the light emitting layer 312 disposed in the opening of the pixel defining layer 290. Accordingly, the pixel defining layer 290 may define light emitting areas.

The protective layer 400 may be disposed on the second electrode 313. The protective layer 400 is configured to protect the OLED 310 from the outside. The protective layer 400 is also called a capping layer. Further, a thin film encapsulation layer (not illustrated) where an inorganic thin film and an organic thin film are alternately laminated may be disposed on the protective layer 400.

The second substrate 500 may be disposed on the protective layer 400. The second substrate 500 is configured to encapsulate the OLED 310 with the first substrate 210. The second substrate may be made of at least one insulating material selected from a group of glass, quartz, ceramic, plastic and the like, similar to the first substrate 210.

An optical film 101 is disposed on the second substrate 500. The optical film 101 is configured to prevent or substantially prevent external light reflection.

As the OLED display device 201 has a multi-layer structure, light generated from the light emitting layer is refracted when passing through the multi-layer laminated structure and produces a different lightpath, thereby causing a WAD phenomenon. The OLED display device 201 according to the sixth embodiment of the present invention includes the optical film 101 disposed on the second substrate 500 and this optical film 101 includes an adhesive layer 120 having a haze value of 90% or more. Thus, WAD is reduced when light emitted from the OLED display device 201 is radiated to the outside.

From the foregoing, it will be appreciated that various embodiments in accordance with the present invention have been described herein for purposes of illustration, and that various modifications may be made without departing from the scope and spirit of the present teachings. Accordingly, the various embodiments disclosed herein are not intended to be limiting of the true scope and spirit of the present teachings.

What is claimed is:

1. An optical film comprising:
   a polarizer and
   a first adhesive layer on the polarizer, the first adhesive layer comprising an adhesive resin and light scattering particles dispersed in the adhesive resin, wherein the only particles dispersed in the adhesive resin are the light scattering particles,
   wherein the first adhesive layer has a haze value of 90% or more,
   wherein a difference in refractive indices between the adhesive resin and the light scattering particles is in a range of 0.15 to 0.25,
   wherein the light scattering particles have an average particle diameter between 1.5 μm and 2.5 μm,
   wherein the first adhesive layer directly contacts the polarizer,
   wherein the polarizer has a thickness of 5 μm to 40 μm, and
   wherein the adhesive resin is an acrylic copolymer, and the acrylic copolymer has a weight-average molecular weight of 50,000 to 2,000,000.

2. The optical film of claim 1, wherein a refractive index of the light scattering particles is larger than a refractive index of the adhesive resin.

3. The optical film of claim 1, wherein the light scattering particles have a refractive index in a range of 1.55 to 1.8.

4. The optical film of claim 1, wherein the light scattering particles comprise at least one of acrylic resins and polystyrene resins.

5. The optical film of claim 1, wherein the light scattering particles have a spherical form.

6. The optical film of claim 1, wherein the adhesive resin comprises at least one of acrylic adhesive resins, silicone-based adhesive resins, rubber-based adhesive resins, polyester-based adhesive resins and urethane-based adhesive resins.

7. An optical film comprising:
   a polarizer and
   a first adhesive layer on the polarizer, the first adhesive layer comprising an adhesive resin and light scattering particles dispersed in the adhesive resin,
   a phase difference layer on the first adhesive layer,
   wherein the first adhesive layer has a haze value of 90% or more,
   wherein a difference in refractive indices between the adhesive resin and the light scattering particles is in a range of 0.15 to 0.25, and
   wherein the light scattering particles have an average particle diameter between 1.5 μm and 2.5 μm,
   wherein the polarizer has a thickness of 5 μm to 40 μm,
   wherein the phase difference layer directly contacts the polarizer, and
   wherein the adhesive resin is an acrylic copolymer, and the acrylic copolymer has a weight-average molecular weight of 50,000 to 2,000,000.

8. The optical film of claim 7, further comprising a second adhesive layer on the phase difference layer.

9. An optical film comprising:
   a polarizer and
   a first adhesive layer on the polarizer, the first adhesive layer comprising an adhesive resin and light scattering particles dispersed in the adhesive resin, wherein the only particles dispersed in the adhesive resin are the light scattering particles,
   a phase difference layer between the polarizer and the first adhesive layer,
   wherein the first adhesive layer has a haze value of 90% or more,
   wherein a difference in refractive indices between the adhesive resin and the light scattering particles is in a range of 0.15 to 0.25, and
   wherein the light scattering particles have an average particle diameter between 1.5 μm and 2.5 μm,
   wherein the polarizer has a thickness of 5 μm to 40 μm,
   wherein the phase difference layer directly contacts the polarizer, and
   wherein the adhesive resin is an acrylic copolymer, and the acrylic copolymer has a weight-average molecular weight of 50,000 to 2,000,000.

10. A display device comprising:
    a display panel; and
    an optical film on a display area of the display panel,
    wherein the optical film comprises a polarizer and a first adhesive layer on the polarizer, the first adhesive layer comprising an adhesive resin and light scattering particles dispersed in the adhesive resin, and
    wherein the only particles dispersed in the adhesive resin are the light scattering particles, wherein the first adhesive layer has a haze value of 90% or more, wherein a difference in refractive indices between the adhesive resin and the light scattering particles is in a range of 0.15 to 0.25, wherein the light scattering particles have an average particle diameter between 1.5 μm and 2.5 μm, and wherein the adhesive resin is an acrylic copolymer, and the acrylic copolymer has a weight-average molecular weight of 50,000 to 2,000,000.

11. The display device of claim 10, wherein a refractive index of the light scattering particles is greater than a refractive index of the adhesive resin.

12. The display device of claim 10, wherein the light scattering particles have a refractive index in a range of 1.6 to 1.8.

13. The display device of claim 10, further comprising a phase difference layer on the first adhesive layer.

14. The display device of claim 10, further comprising a phase difference layer between the polarizer and the first adhesive layer.

15. An optical film comprising:

a polarizer and a first adhesive layer on the polarizer, the first adhesive layer comprising an adhesive resin and light scattering particles dispersed in the adhesive resin, wherein the only particles dispersed in the adhesive resin are the light scattering particles, wherein the first adhesive layer has a haze value of 90% or more, wherein a difference in refractive indices between the adhesive resin and the light scattering particles is in a range of 0.15 to 0.25, wherein the light scattering particles have an average particle diameter between 1.5 μm and 2.5 μm, and wherein the adhesive resin is an acrylic copolymer, and the acrylic copolymer has a weight-average molecular weight of 50,000 to 2,000,000.

* * * * *